A. M. SHERER.
SECONDARY BATTERY.
APPLICATION FILED MAR. 25, 1912.

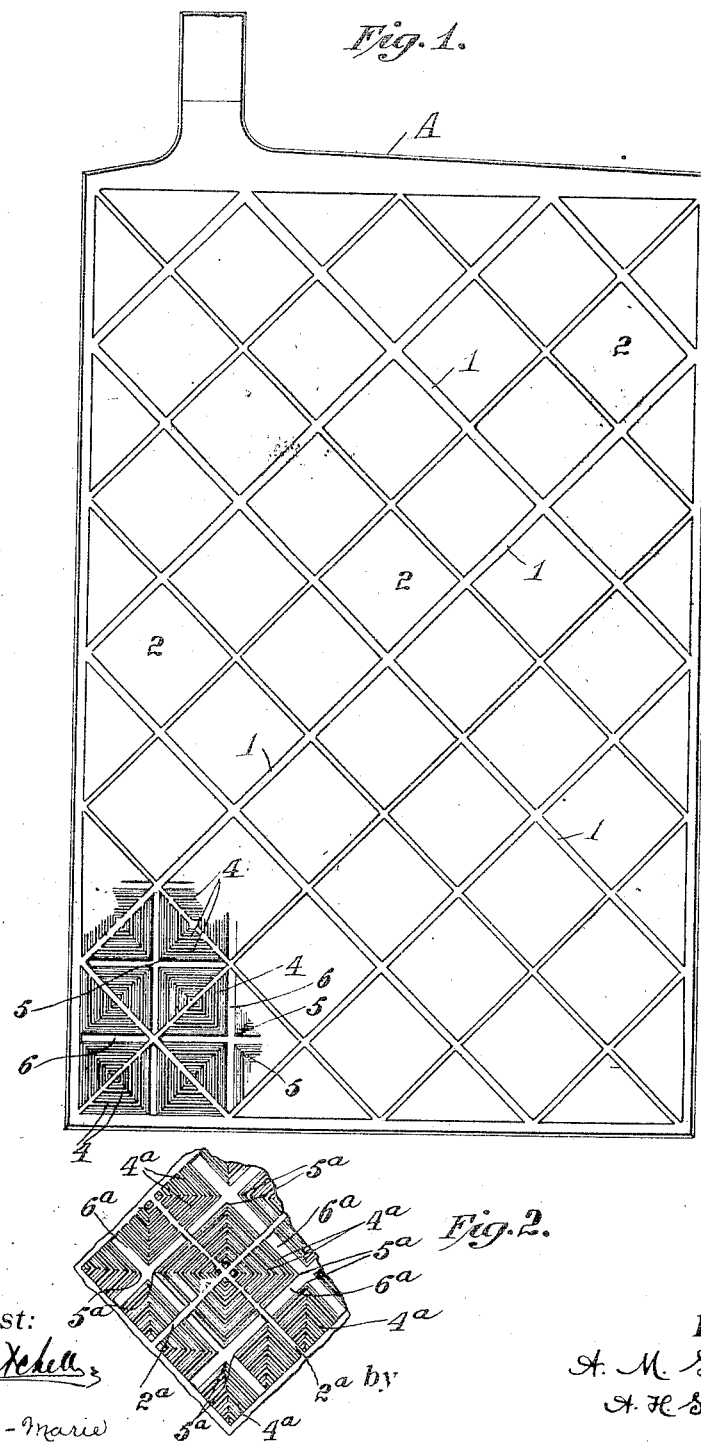

1,071,359.

Patented Aug. 26, 1913.
3 SHEETS—SHEET 2.

Inventor:
A. M. Sherer

A. M. SHERER.
SECONDARY BATTERY.
APPLICATION FILED MAR. 25, 1912.
1,071,359.
Patented Aug. 26, 1913.
3 SHEETS—SHEET 3.
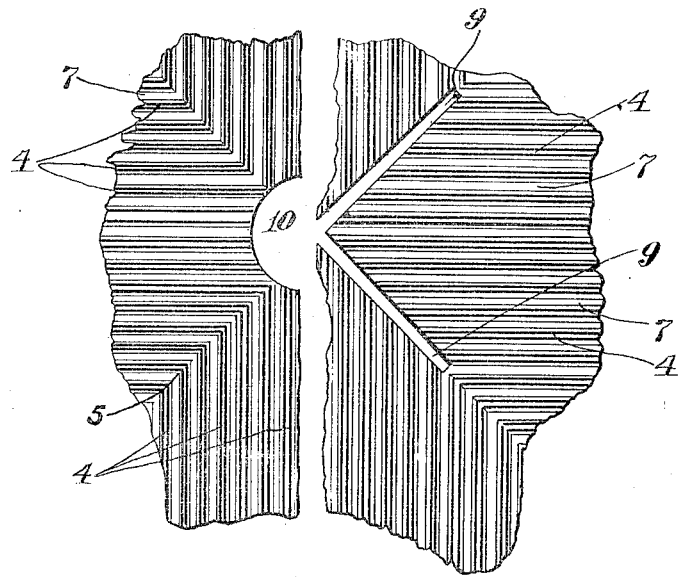
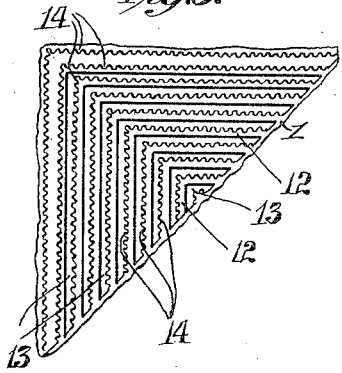
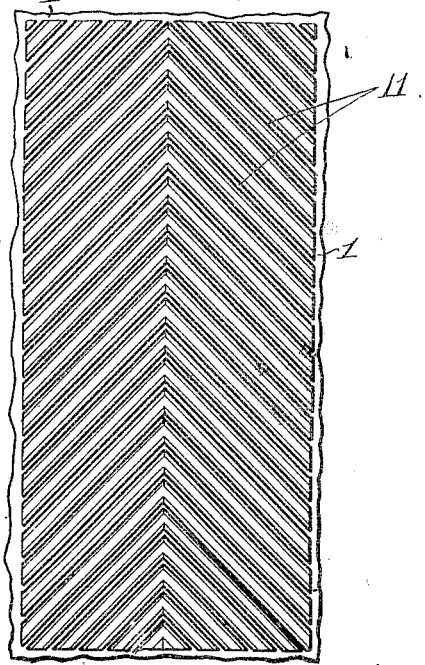
Attest:
J. C. Mitchell
James Sainte-Marie
Inventor:
A. M. Sherer
A. H. Ste. Marie
Atty

UNITED STATES PATENT OFFICE.

ARTHUR M. SHERER, OF PHILADELPHIA, PENNSYLVANIA, ASSIGNOR TO CHARLES TAYLOR FOX, OF WAYNE, PENNSYLVANIA.

SECONDARY BATTERY.

1,071,350.  Specification of Letters Patent.  Patented Aug. 26, 1913.

Application filed March 25, 1912. Serial No. 686,012.

*To all whom it may concern:*

Be it known that I, ARTHUR MILTON SHERER, a citizen of the United States, residing at Philadelphia, in the county of Philadelphia and State of Pennsylvania, have invented certain new and useful Improvements in Secondary Batteries, of which the following is a specification.

This invention relates to grids for accumulators of the Planté type in which the positive and negative elements are made of lead from which the active material is formed by the charging current passing from the positive to the negative plates through the electrolyte, and therefore the grid of this invention is distinguished from that type of grid in which the active material in paste or powder form is mechanically applied in the numerous ways now known in the art.

In the common form of Planté storage battery, the leaden plates or grids are heavy, expensive, inefficient and otherwise unsatisfactory, so that it is the object of the present invention to provide a grid which is so designed as to have a high efficiency compared with its weight and size, and furthermore which reduces to a minimum the buckling in other types of grid that is objectionable on account of short-circuiting.

In carrying out the invention, the grid is made in the form of a skeleton frame of rectangular or other shape and provided with diagonal or other suitably arranged webs, ribs or bars disposed in intersecting relation so as to define square or other polygonal spaces in which are disposed concentric ribs of suitable form, the said ribs being arranged in groups that are separated from each other by spaces through which the electrolyte can freely circulate. This particular arrangement of groups of ribs allows of expansion toward a central point in each square or other figure in which the groups of ribs are disposed, and in this way buckling is reduced to a minimum. The ribbed surfaces thus provided afford a maximum surface exposed to the electrolyte within a minimum area so that the efficiency of the grid is materially increased.

Other advantages and details of construction will be set forth hereinafter in connection with the accompanying drawings, in which—

Figure 3:
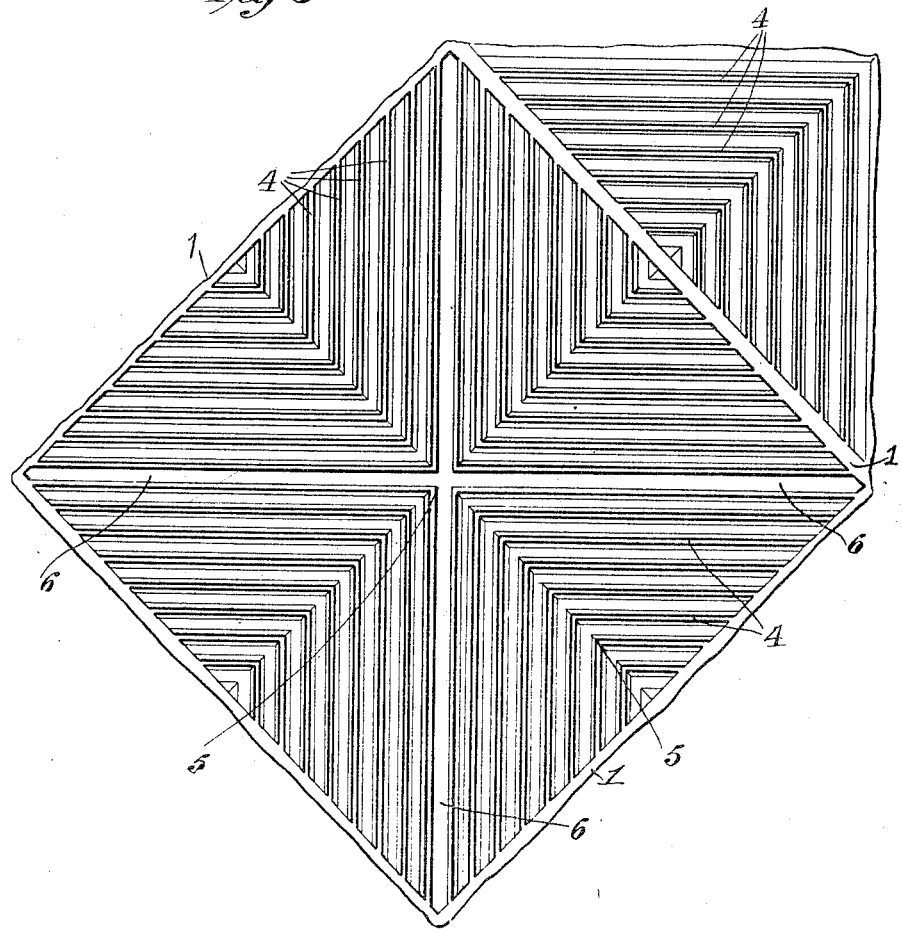
Figure 4:
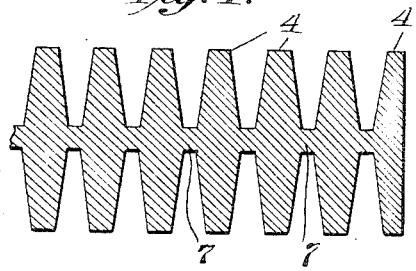
Figure 5:
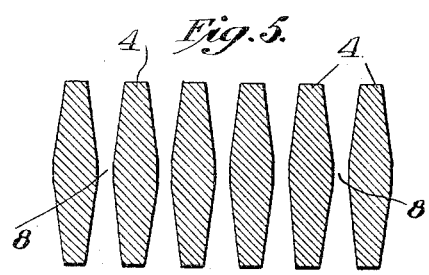

Figure 1 is a side view of the grid with several of the squares shown with their groups of ribs or laminations. Fig. 2 is a fragmentary view of a grid showing another arrangement of ribs. Fig. 3 is an enlarged view of a portion of Fig. 1. Fig. 4 is a detail sectional view taken transversely to a group of ribs showing the same integrally connected together. Fig. 5 is a similar view in which the ribs are shown separate from each other. Figs. 6 and 6ª are views of different constructions adapted for the negative grids. Figs. 7 and 8, are fragmentary views of various modifications of rib grouping.

Similar reference characters are employed to designate corresponding parts throughout the views.

Referring to the drawings, A designates the frame of the grid which in the present instance is shown rectangular and having diagonal bars, webs or main ribs 1 integrally connected with the side, top and bottom bars of the frame. The main ribs 1 intersect each other at such an angle as to form squares 2 in which are disposed groups of secondary ribs or laminations 4, but it is to be understood that the webs or main ribs 1 can be so disposed as to form any other polygonal figures than squares and the number of groups of secondary ribs or laminations will vary accordingly.

As shown more particularly in Fig. 3, the secondary ribs 4 are concentrically arranged in each group and are triangular in shape in such relation to each other that the apexes 5 lie in diametrical lines and the ends of these secondary ribs or laminations are integrally connected with the main ribs 1. The groups of ribs are separated from each other by diagonal spaces 6 so that the groups are free to expand inwardly from the sides of the square in which they are confined, and furthermore these diagonal openings allow the electrolyte to freely circulate. It will be noted that the weakest part of the main ribs is at a point centrally of the intersections and the secondary ribs are connected with the main ribs at opposite sides of the weakest point of the latter in spaced relation from the center of the ends or corners where two main ribs intersect, and in this manner the secondary ribs serve to reinforce the main ribs. The groups of secondary ribs on opposite sides of the main rib are symmetrically disposed and thus they have a counteractive or equalizing effect in expansion so that the tendency to buckle is minimized. The concentric ribs of each group may be integrally connected by webs 7, as shown in Fig. 4, or they may be separated by spaces 8, as shown in Fig. 5. In the latter case, the electrolyte can mo freely circulate, but in both cases a large surface of the grid is exposed to the electrolyte.

In Fig. 2, the secondary ribs 4ª are so arranged with respect to the main ribs 2ª that the spaces 6ª between the groups are diametrical, that is, they extend from one side to the other, while the apexes 5ª of the groups of each square lie in diagonal lines or in lines extending between opposite corners instead of diametrical, as in Fig. 3. Or, described in another way, the ribs 4ª, Fig. 2, have their ends connected to two sides of the squares formed by the intersecting main ribs 2ª, whereas in Fig. 3, each group of concentric secondary ribs is integrally connected with the same side of the square.

Grids designed as above described are made of commercially pure lead and are cast, stamped, pressed or otherwise formed in one piece, and by reason of the peculiar formation, the structure obtained is comparatively rigid and light, although a large surface is provided for the chemical action to take place thereon.

The negative plates are designed with the same arrangement of groupings of secondary ribs, as is evident from Figs. 6 and 6ª, but it is found preferable to separate the centers of the groups by either radial slots or openings 9, as shown in Fig. 6, or by a single opening 10, as shown in Fig. 6ª, the advantage of this construction for the negative plate being that the acid can better percolate through the plate, thus giving concentration of the electrolyte in the pores of the plate uniformly in all the stages of charging and discharging. This gives a higher capacity for a given amount of lead and also decreases the weight of the cell. Figs. 6 and 6ª, it will be understood, represent each but a fragmentary portion of one half of a negative plate, the portions shown in the two views being taken from opposite halves of different plates. The openings 9 and 10 are designed to be central in their respective plates, so that the inner edge of each figure corresponds to a break through the middle of the plate thereby represented in part, and a mere, reversed duplication of the part illustrated would give a practially full view of the center of the negative plate in each instance.

In Fig. 7, a modification of rib arrangement is shown, the ribs 11 being triangular or V-shaped and disposed parallel with each other and designed for rectangular grouping. In Fig. 8, the ribs 12, which are separated from each other by spaces 13, have one or more sides corrugated, as shown at 14, so as to increase the surface exposed to the electrolyte. The ribs 11 and 12 of these grids are connected with the main ribs 1.

It will be understood that the active material will be chemically formed on the grids by the current passing through the electrolyte in which the grids are placed and consequently said material is an integral part of the grid, so that the internal resistance of the cell or battery is considerably lower than it is with those plates in which the paste or powder that forms the active material is mechanically applied.

By reason of the specific disposition and construction of the secondary ribs, expansion takes place in such a manner that buckling is minimized. The expansion is localized and confined to individual sections which are the squares of the grid and in these squares the secondary ribs expand inwardly toward the center, and as the groups of secondary ribs are isolated or separated from each other, this expansion does not produce a buckling action. The grid, as herein constructed, is further characterized by increased efficiency and it also permits of a rapid circulation and a thorough distribution of electrolytes.

Having thus described the invention, what I claim as new, is:—

1. A storage battery grid comprising a frame provided with main ribs or webs, and a plurality of groups of concentric secondary ribs having their ends connected with the main ribs and their intermediate portions free therefrom, the groups of ribs being disposed about a common point and the ribs of the groups being free to expand toward such point.

2. A storage battery grid comprising a frame provided with main ribs or webs, a plurality of groups of concentric secondary ribs having their ends connected with the main ribs and their intermediate portions free therefrom, the groups of ribs being disposed about a common point and the ribs of the groups being free to expand toward such point, and connecting webs between adjacent ribs of each group.

3. A storage battery grid comprising a frame having webs all lying in the same plane, symmetrical groups of separate concentrically arranged ribs on opposite sides of the webs and having their ends integrally connected with the latter and their intermediate portions free to expand away from the webs in a direction perpendicular thereto.

4. A storage battery grid comprising a frame having webs or main ribs defining polygonal spaces, and a plurality of groups of concentrically arranged ribs in each space, the groups of ribs being separated from each other to permit the ribs to expand toward a central point in each space.

5. A storage battery grid comprising a frame, webs or main ribs connected together and defining polygonal spaces, and a plurality of groups of concentrically arranged V-shaped secondary ribs extending toward the center of the said spaces and having their ends connected with the main ribs and their apexes spaced therefrom.

6. A storage battery grid comprising a frame, webs or main ribs connected together and defining polygonal spaces, and a plurality of groups of concentrically arranged V-shaped secondary ribs having their ends connected with the main ribs and their apexes spaced therefrom, said groups of ribs being spaced from each other.

7. A storage battery grid having main ribs dividing it into substantially square spaces, and symmetrically disposed groups of separate concentric V-shaped secondary ribs the ends of which rest on opposite sides of the main ribs, the apexes of the secondary ribs on each main rib being disposed in a line extending transversely to such main rib and stopping short of the center of the square space thereto appertaining.

8. A grid comprising a frame having main ribs or webs forming polygons, a plurality of separate concentric ribs on the sides of the polygons and extending toward the center thereof from such sides, the groups of secondary ribs being separated by diagonal spaces whereby the secondary ribs are free to expand to the centers of the polygons.

In testimony whereof I affix my signature in presence of two witnesses.

ARTHUR M. SHERER.

Witnesses:
 CHAS. T. FOX,
 A. H. STE. MARIE.